United States Patent
Araki et al.

(10) Patent No.: US 10,665,067 B2
(45) Date of Patent: May 26, 2020

(54) SYSTEMS AND METHODS FOR INTEGRATING HAPTICS OVERLAY IN AUGMENTED REALITY

(71) Applicant: Immersion Corporation, San Jose, CA (US)

(72) Inventors: Satoshi Araki, Redwood City, CA (US); Christopher J. Ullrich, Ventura, CA (US); Liwen Wu, Montreal (CA); Juan Manuel Cruz-Hernandez, Montreal (CA); Danny A. Grant, Laval (CA); Sanya Attari, Fremont, CA (US); Colin Swindells, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 16/010,230

(22) Filed: Jun. 15, 2018

(65) Prior Publication Data

US 2019/0385419 A1    Dec. 19, 2019

(51) Int. Cl.
*G08B 6/00* (2006.01)
*G06T 11/60* (2006.01)

(52) U.S. Cl.
CPC ............... *G08B 6/00* (2013.01); *G06T 11/60* (2013.01)

(58) Field of Classification Search
None
See application file for complete search history.

(56) References Cited

U.S. PATENT DOCUMENTS

| | | |
|---|---|---|
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,462,262 B1 | 10/2016 | Worley, III et al. |
| 9,626,805 B2 | 4/2017 | Lampotang et al. |
| 9,645,646 B2 | 5/2017 | Cowley et al. |

(Continued)

FOREIGN PATENT DOCUMENTS

| | | |
|---|---|---|
| EP | 2755194 A1 | 7/2014 |
| WO | 2017/024181 A1 | 2/2017 |

OTHER PUBLICATIONS

EP 19180347.7, "Extended European Search Report," dated Oct. 30, 2019, 10 pages.

(Continued)

*Primary Examiner* — Frank S Chen
(74) *Attorney, Agent, or Firm* — Kilpatrick Townsend & Stockton LLP

(57) ABSTRACT

Systems and methods for integrating haptics overlay in augmented reality are disclosed. One illustrative system described herein includes a haptic output device. The system also includes a display configured to output a visual effect. The system also includes a sensor for tracking a position of a proxy object. The system also includes a processor configured to: determine a modified visual effect based in part on data received from the sensor, determine a haptic effect based in part on data received from the sensor, transmit a display signal associated with the modified visual effect to the display, transmit a haptic signal associated with the haptic effect to the haptic output device; and output the haptic effect using the haptic output device.

21 Claims, 4 Drawing Sheets

(56) References Cited

U.S. PATENT DOCUMENTS

| | | |
|---|---|---|
| 9,652,037 B2 | 5/2017 | Rubin et al. |
| 9,760,166 B2 | 9/2017 | Ammi et al. |
| 9,851,799 B2 | 12/2017 | Keller et al. |
| 9,911,854 B2 | 3/2018 | Jongman et al. |
| 9,933,851 B2 | 4/2018 | Goslin et al. |
| 9,948,885 B2 | 4/2018 | Kurzweil |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0274662 A1* | 9/2016 | Rimon ............... G06F 3/014 |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2018/0040038 A1* | 2/2018 | Vanslette ............ H04W 4/02 |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |
| 2018/0144549 A1* | 5/2018 | Gonzalez ........ G02B 27/0101 |

OTHER PUBLICATIONS

Harley, D. et al., "Tangible VR: Diegetic Tangible Objects for Virtual Reality Narratives," DIS 2017, Jun. 10, 2017, Edinburgh, UK, pp. 1253-1263.

* cited by examiner

SYSTEMS AND METHODS FOR INTEGRATING HAPTICS OVERLAY IN AUGMENTED REALITY

FIELD OF THE INVENTION

The present application relates to the field of user interface devices. More specifically, the present application relates to integrating haptics overlay in augmented reality.

BACKGROUND

Virtual and Augmented Reality ("VR" and "AR") applications have become increasingly popular. VR applications typically incorporate a dedicated controller to allow the user to feel a touch sensation of the virtual object. For example, a VR user may experience a gun shooting in his hand in the VR application and may simultaneously feel a haptic effect simulating that shooting through the dedicated controller. In AR space, it is difficult to provide a haptic effect to the user. Accordingly, systems and methods for integrating haptics overlay in augmented reality are needed.

SUMMARY

Embodiments of the present disclosure comprise systems and methods for integrating haptics overlay in augmented reality. In one embodiment, a system comprises a haptic output device. The system also comprises a display configured to output a visual effect. The system also comprises a sensor for tracking a position of a proxy object. The system also comprises a processor configured to: determine a modified visual effect based in part on data received from the sensor, determine a haptic effect based in part on data received from the sensor, transmit a display signal associated with the modified visual effect to the display, transmit a haptic signal associated with the haptic effect to the haptic output device; and output the haptic effect using the haptic output device.

In another embodiment, a method for integrating haptics overlay in augmented reality comprises determining a modified visual effect based in part on data received from a sensor, determining a haptic effect based in part on data received from the sensor, transmitting a display signal associated with the modified visual effect to a display, transmitting a haptic signal associated with the haptic effect to a haptic output device; and outputting the haptic effect using the haptic output device.

In yet another embodiment, a non-transitory computer readable medium may comprise program code, which when executed by a processor is configured to perform such methods.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
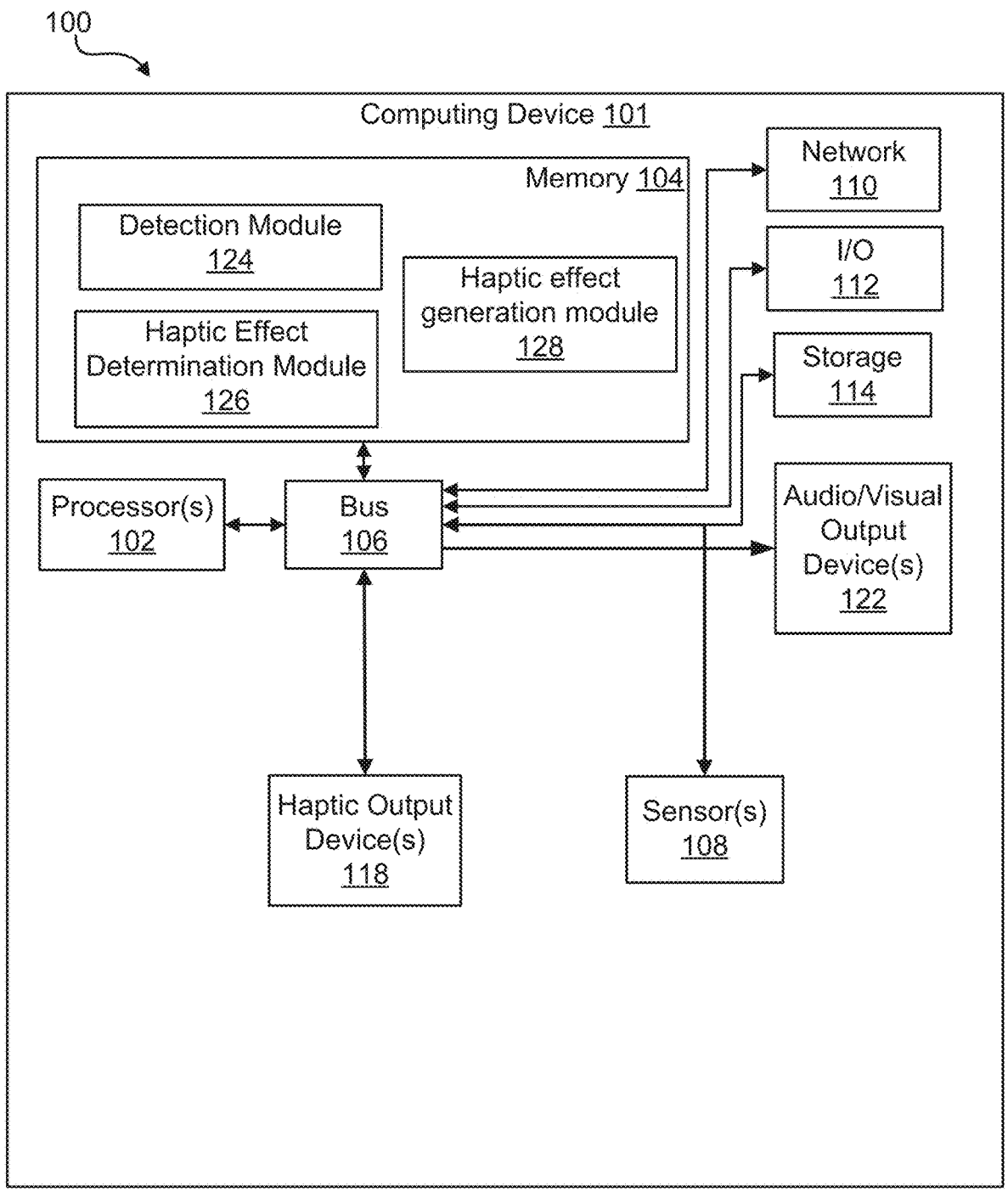
FIG. 1 shows an illustrative system for integrating haptics overlay in augmented reality.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of Integrating Haptics Overlay in Augmented Reality

Embodiments provide for haptic feedback on virtual objects in AR space. Such embodiments may allow a user to see and feel a texture on a real world object using a haptics overlay on that object. Alternatively, such an embodiment may seamlessly incorporate a wearable peripheral device that is also capable of providing haptic feedback. In other embodiments, just the wearable peripheral device may be used to provide haptic feedback. In some embodiments, AR space comprises VR space.

In one illustrative embodiment, a user is wearing an AR headset and is looking at a proxy object, e.g., a shoe, in real space. The user may choose a material from a library of materials (e.g., materials such as one or more of leather, plastic, rubber, metal, burlap, suede, denim, wood, cloth, ceramic, foamed material, or glass). This material will then be displayed on the proxy object via the AR headset by saying a voice command out loud (e.g., apply leather material) or inputting instructions via a visual menu in a VR or AR headset, a hand controller, a wearable device, or gesture recognition. The illustrative AR display of the AR headset is modified based on the command so that the appearance of the proxy object is modified through the AR display to show the proxy object made of the selected material.

In one illustrative embodiment, a haptic effect associated with the proxy object is output by a haptic output device, e.g., an actuator, that outputs a haptic effect (e.g., a vibration or ESF effect) simulating a texture of the material selected from the library. In still other illustrative embodiments, a haptic effect is produced by a wearable peripheral device, such as a glove. The user interacting with the proxy object feels the haptic effect, and the haptic effect simulates different textures on the surface of the proxy object (e.g., the haptic effect may simulate the texture of one or more of leather, plastic, rubber, metal, burlap, suede, denim, wood, cloth, ceramic, foamed material, or glass).

In one illustrative embodiment, information from a sensor(s) is passed to a processor that is also processing and outputting haptic signals associated with haptic effects associated with a texture. The modified image of the proxy object through the AR display, and the texture output by the haptic output device, can then be modified in real-time to reflect any movement of the proxy object. In addition, or alternatively, the processor can use information from a sensor(s) to tell when a wearable peripheral device comes into "contact" with an AR object. These sensors may further detect movement of the user associated with the proxy object and modify visual and haptic effects based on the user's movement.

This illustrative example is given to introduce the reader to the general subject matter discussed herein and the disclosure is not limited to this example. The following sections describe various additional non-limiting examples of the present disclosure.

Illustrative Systems for Integrating Haptics Overlay in Augmented Reality

FIG. 1 shows an illustrative system 100 for integrating environmental haptics in virtual reality. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device 101. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network(s)).

I/O components 112 may be used to facilitate connection to devices such as one or more displays, such as VR and AR headsets or touch screen displays, keyboards, mice, speakers, microphones, cameras, and/or other hardware used to input data or output data. Storage 114 represents nonvolatile storage such as magnetic, optical, or other storage media included in device 101. In some embodiments, I/O components 112 may comprise VR controllers or AR input devices. In other embodiments, I/O components may comprise a controller or input device in a transportation device, such as a car, or boat. In yet other embodiments, the controllers or input devices may be the user's hands, and sensors 108 may be able to detect the movements and gestures in free space.

Audio/visual output device(s) 122 comprise one or more devices configured to receive signals from processor(s) 102 and provide audio or visual output to the user. For example, in some embodiments, audio/visual output device(s) 122 may comprise a display such as a touch-screen display, LCD display, plasma display, CRT display, projection display, or some other display known in the art. For use in augmented or virtual reality, audio/visual output device 122 may comprise a headset comprising a display for each eye, a mobile device, e.g., a mobile phone or tablet, a windshield of a vehicle, or some other display known in the art. Further, audio/visual output devices may comprise one or more speakers configured to output audio to a user.

System 100 further includes one or more sensors 108. The sensors 108 are configured to detect a haptic output device 118 and provide appropriate data for use by processor 102.

Any suitable number, type, or arrangement of sensors can be used. For example, different embodiments may include cameras, lasers, radars, accelerometers, gyrometers, pressure sensors, magnetic sensors, light sensors, microphones, capacitive sensors, touch sensors, tracking sensors, or any combination of such sensors. In one embodiment, a camera, laser mapping, or radar scanning is used to identify the haptic output device 118. Such an embodiment may utilize artificial intelligence ("AI") to make the identification. An accelerometer may be used to detect vibration, displacement, and speed. A gyrometer may be used to sense rotation. A pressure sensor may be used to determine altitude and a magnetic sensor to determine direction or orientation. A light sensor may be used to determine perceived luminosity. And a microphone may be used to detect sound. Any of these sensors may be used in combination with any other sensor.

In other embodiments, the sensor 108 may comprise an LED detector. In some embodiments, the processor 102 is in communication with a single sensor 108, in other embodiments, the processor 102 is in communication with a plurality of sensors 108.

Although a single haptic output device 118 is shown here, embodiments may use multiple haptic output devices of the same or different type to output haptic effects. For example, haptic output device 118 may comprise one or more of, for example, a piezoelectric actuator, an electric motor, an electro-magnetic actuator, a voice coil, a shape memory alloy, an electroactive polymer, a solenoid, an eccentric rotating mass motor (ERM), or a linear resonant actuator (LRA), a low profile haptic actuator, a haptic tape, or a haptic output device configured to output an electrostatic effect, such as an Electrostatic Friction (ESF) actuator. In some embodiments, haptic output device 118 may comprise a plurality of actuators, for example a low profile haptic actuator, a piezoelectric actuator, and an LRA. Further, haptic output device 118 may be integrated into a proxy object or into the user's clothing or a wearable device.

In some embodiments, haptic output device 118 may be used to output thermal and or kinesthetic properties to the user. For example, the thermal conductivity of different materials could be conveyed by overlaying heating and cooling transducers, e.g., Peltier devices. In other embodiments, the force feedback properties could be overlaid with transducers that modify the stiffness of a material, e.g., using electroactive polymer tendons.

Turning to memory 104, exemplary program components 124, 126, and 128 are depicted to illustrate how a device may be configured to determine and output haptic effects. In this example, a detection module 124 configures processor 102 to monitor sensor(s) 108 to determine characteristics of haptic output device 118. For example, detection module 124 may sample sensor 108 in order to track one or more of the location, path, velocity, acceleration, pressure, and/or other characteristics of haptic output device 118 over time.

Haptic effect determination module 126 represents a program component that analyzes data regarding audio and video characteristics to select a haptic effect to generate. Particularly, module 126 comprises code that determines, based on the characteristics of haptic output device 118 and AR environment, one or multiple effects to generate and output by the haptic output device 118. Haptic effect determination module 126 may further comprise code that selects one or more existing haptic effects to output in response to detection of a change in characteristics of haptic output device 118. Different haptic effects may be selected based on various combination of these features.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of haptic effect and utilize signal processing algorithms to generate an appropriate signal to send to haptic output device 118. As a further example, a desired haptic effect may be indicated along with target coordinates for the texture and an appropriate waveform sent to one or more actuators to generate appropriate displacement of the surface (and/or other device components) to provide the haptic effect. Some embodiments may utilize multiple haptic output devices in concert to simulate a feature. For example, a vibration may be utilized to convey a specific texture to the user while, simultaneously, a kinesthetic effect is output to indicate the stiffness of an object, such as the stiffness of a shoe upper's material. Such a configuration is merely illustrative and not the sole way in which such a system may be constructed.

Figure 2:
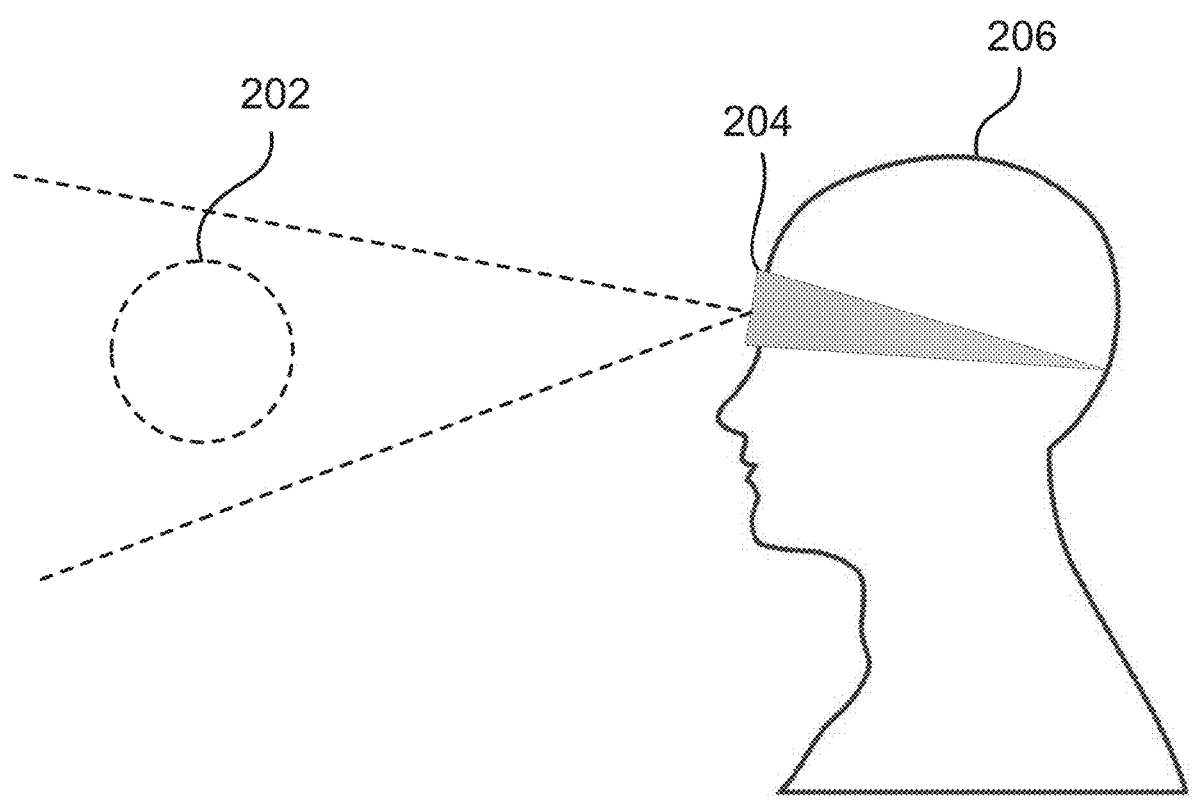
FIG. 2 shows another illustrative system for integrating haptics overlay in augmented reality.

FIG. 2 shows another illustrative system for integrating haptics overlay in augmented reality. In the embodiment shown in FIG. 2, a user 206 is wearing a wearable AR device 204 and interacting with a proxy object 202. Though this embodiment shows the user wearing a wearable AR device 204, any type of AR display system may be used. The illustrative system of FIG. 2 may incorporate the system illustrated in FIG. 1 for sensing conditions of proxy object 202 as well as for determining, generating and outputting haptic effects. The wearable AR device 204 may include a visual display as well as headphones or speakers.

In some embodiments, proxy object 202 may take the form of any object, including, but not limited to, a shoe, a bag, an article of clothing, an electronic device, a display, or an interface object. In other embodiments, proxy object 202 may comprise neutral physical characteristics, like color and texture, e.g. a proxy object made of white color with a smooth surface material. In still other embodiments, proxy object 202 may comprise a high fidelity visual prototype, e.g., a high fidelity visual shoe prototype with photorealistic graphic stenciling, so a visual overlay using wearable AR device 204 is unnecessary.

The user 206 may choose any texture from a given library of textures, e.g., leather, plastic, rubber, metal, burlap, suede, denim, wood, cloth, ceramic, foamed material, or glass, and an augmented reality visual effect will modify the appearance of the proxy object through the wearable AR device 204. In some embodiments, the user will choose the texture using an input capture device such as an audio capture device, a touchscreen, a keyboard, a mouse, a joystick, or an augmented reality control board. Processor 102 will receive an input signal from the input capture device and determine the haptic effect and visual effect modification that must be transmitted via a haptic signal and display signal, respectively.

In some embodiments, once the display signal is transmitted, the visual effect will be output through wearable AR device 204. So, the user 206 will be able to view the proxy object with the chosen texture through the wearable AR device 204. For example, if the user 206 chooses a red leather, then the user 206 will see the proxy object 202 made of that same red leather through the wearable AR device 204.

As the AR visual effect is changed through the choice of texture, a haptic signal is transmitted to the haptic output device(s) 118 contained in proxy object 202. These haptic output devices output a haptic effect associated with the selected texture, which enables user 206 to feel the chosen texture through the haptic effect produced in proxy object 202 as the user touches proxy object 202.

In some embodiments, sensors 108 track proxy object 202 so the texture produced by the haptic effect in proxy object 202 and the AR visual effect may be felt and seen, respectively, regardless of any movement or rotation of proxy object 202 by user 206. In other embodiments, the speakers or headphones of wearable AR device 204 may emit audio feedback to convey the sounds user 206 would hear if an actual textured object were being touched. In still other embodiments, no audio feedback is emitted.

Figure 3:
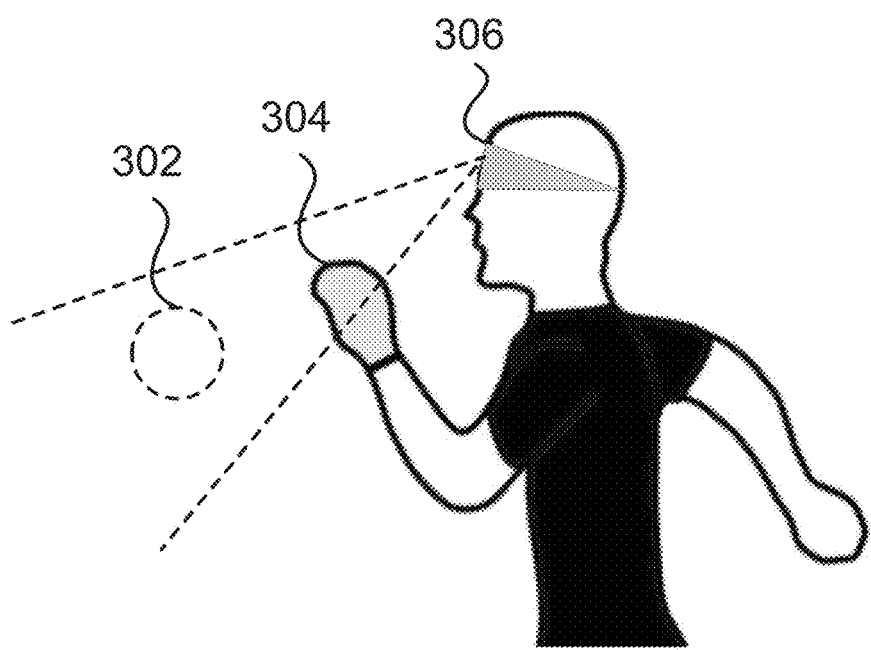
FIG. 3 shows another illustrative system for integrating haptics overlay in augmented reality.

FIG. 3 shows another illustrative system for integrating haptics overlay in augmented reality. In the embodiment shown in FIG. 3, a user is wearing a wearable AR device 306 and a wearable peripheral device 304 and interacting with a proxy object 302. In some embodiments, proxy object 302 may comprise any of the same features as proxy object 202.

Wearable peripheral device 304 may comprise a glove that covers the user's whole hand, a glove that covers only some of the user's hand and fingers, e.g., only the user's thumb and index finger, pieces that only cover the user's fingertips, a shoe, a shirt, a pair of pants, or any other article of clothing. Wearable peripheral device 304 and proxy object 302 comprise one or more haptic output device(s) 118, e.g., actuators, capable of outputting a haptic effect to the user.

In some embodiments, the user will not interact with proxy object 302. Instead, a chosen object will be displayed as a visual effect through the AR display of the wearable AR device 306. The user may again choose a texture and that texture will be displayed on the object being displayed through the AR display. For example, the user may choose a red leather shoe and a red leather shoe may be displayed through the AR display of the wearable AR device 306.

A sensor 108 may be used to track the position or other characteristics of wearable peripheral device 304. This allows the system to determine when wearable peripheral device 304 makes "contact" with the object being displayed through the AR display. Once this "contact" is made a haptic signal will be transmitted to wearable peripheral device 304 so a haptic effect corresponding to the object and texture chosen may be output by wearable peripheral device 304. For example, using the red leather shoe example from above, the user may go to feel the red leather shoe. As the user touches the object based on the AR display of the wearable AR device 306, a haptic effect is output to wearable peripheral device 304 so the user feels as if he is touching an actual red leather shoe.

In other embodiments, a user will use both a proxy object 302 and a wearable peripheral device 304. The chosen texture is displayed through the AR display of wearable AR device 306 so proxy object 302 appears to have the chosen texture. In some embodiments, proxy object 302 and wearable peripheral device 304 comprise at least one haptic output device 118 configured to output a haptic effect. One or more sensors 108 track characteristics of both proxy object 302 and wearable peripheral device 304. Through the use of proxy object 302 and wearable peripheral device 304, a high-fidelity touch sensation may be achieved.

Figure 4:
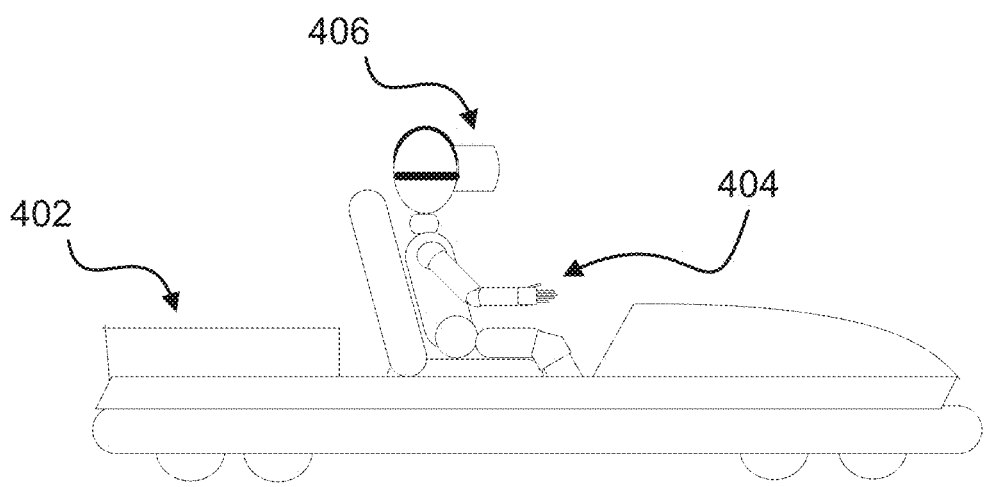
FIG. 4 shows another illustrative system for integrating haptics overlay in augmented reality.

FIG. 4 shows another illustrative system for integrating haptics overlay in augmented reality. In the embodiment shown in FIG. 4, a user is wearing a wearable AR device 406 and a wearable peripheral device 404 and interacting with a system of proxy objects 402, which comprises at least one proxy object. In some embodiments, the proxy objects that make up the system of proxy objects 402 may comprise any of the same features as proxy object 202.

The system of proxy objects 402 may be arranged to resemble any number of areas, including the interior of a car, the cockpit of a plane, the desk of an office, etc. A user may select a variety of textures to be output throughout the system of proxy objects 402. For example, the user might select a black leather texture for the steering wheel of a car with a cherry walnut wooden center console.

In the embodiment of FIG. 4, a haptic effect may be output via only a system of proxy objects 402 or via a combination of a system of proxy objects 402 and wearable peripheral device 404. For example, a vehicle dealership may have a system of proxy objects 402 set up to simulate a certain style of vehicle in a show room. Potential buyers may interact with the system by choosing different materials to be output in different areas of the simulated vehicle. The system of proxy objects 402 may be able to accurately output haptic effects simulating the texture of the different materials without the potential buyers wearing a wearable peripheral device 404. In other embodiments, combining a system of proxy objects 402 with a wearable peripheral device 404. For example, in a gaming environment, a system of proxy objects 402 may be used to simulate a recurring environment throughout the game (e.g., in a racing game, the system of proxy objects 402 may simulate the interior of a vehicle). Further incorporating a wearable peripheral device 404 could allow the use to explore gaming environments outside of the system of proxy objects 402 as well as enhance the user experience when interacting with a system of proxy objects 402.

Illustrative Methods for Integrating Haptics Overlay in Augmented Reality

Figure 5:
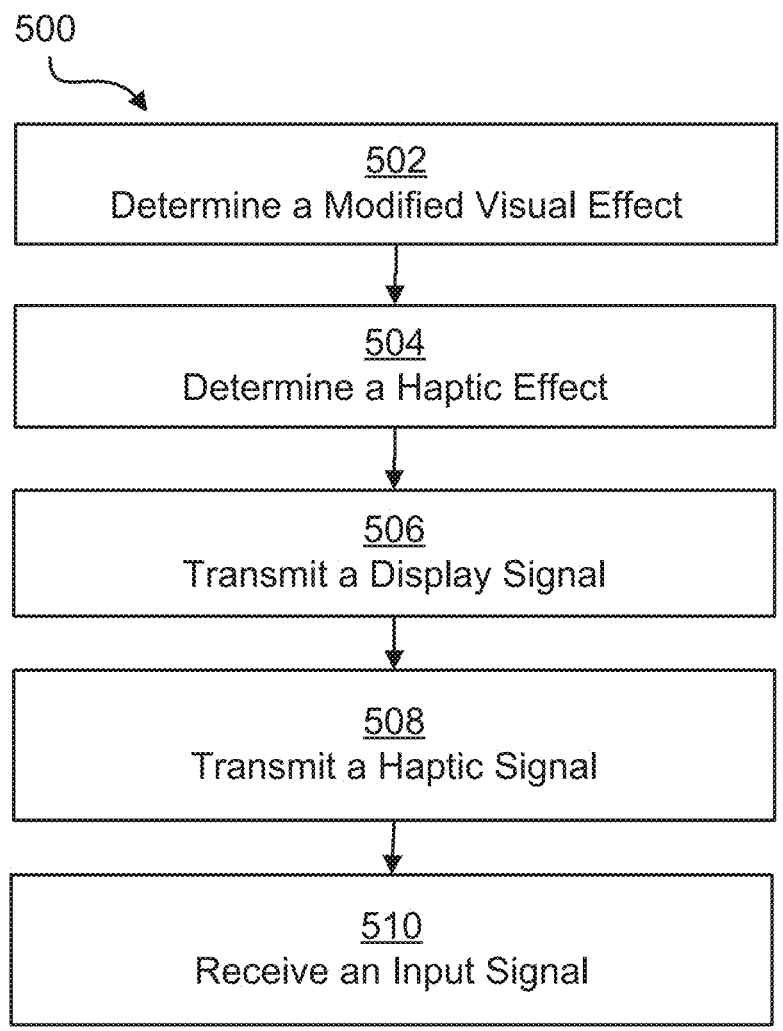
FIG. 5 is a flow chart of method steps for one example embodiment for integrating haptics overlay in augmented reality.

FIG. 5 is a flow chart of method steps for one example embodiment for integrating haptics overlay in augmented reality. In some embodiments, the steps in FIG. 5 may be implemented in program code that is executed by a processor, for example, the processor in a general purpose computer, a mobile device, virtual reality or augmented reality control system, or a server. In some embodiments, these steps may be implemented by a group of processors. In some embodiments one or more steps shown in FIG. 5 may be omitted or performed in a different order. Similarly, in some embodiments, additional steps not shown in FIG. 3 may also be performed. The steps below are described with reference to components described above with regard to computing device 101 shown in FIG. 1 and the system shown in FIG. 2.

In the embodiment shown, a process 500 begins at step 502 when a processor, such as processor 102, determines a modified visual effect. The processor 102 receives sensor signals from one or more sensors 108. Using the sensor signals, the processor 102 analyzes the environment to identify characteristics of proxy object 202. Based on these characteristics, processor 102 may determine a modified visual effect. For example, processor 102 may determine that a blue leather material to display on a proxy object 202, in this case a shoe. Based on data from sensors 108, processor 102 may analyze any movement of the shoe by the user and determine the appropriate modified visual effect to display the blue leather material on the shoe.

At step 504 the processor 102 next determines a haptic effect based on signals received from sensors 108. Similar to step 502, the processor 102 receives sensor signals from sensors 108, and using those sensor signals, analyzes the environment to identify characteristics of proxy object 202 to determine a haptic effect. In some embodiments, processor 102 determines the haptic effect using a library of textures. For example, processor 102 may determine the appropriate texture of the blue leather material of the shoe to output as a haptic effect. In some embodiments, processor 102 may determine the haptic effect to output to simulate a blue leather material on a shoe based on a blue leather haptic effect stored in the library of textures in memory 114. The processor 102 may also receive data from sensor 108 monitoring any movement of the shoe to determine the haptic effect to output to ensure the movement of the shoe does not interfere with blue leather texture produced by the haptic effect.

At step 506 the processor 102 transmits a display signal associated with the modified visual effect to the augmented reality display, e.g., wearable AR device 204. For example, when viewed through the wearable AR device 204, the shoe will appear to be made of blue leather material. The augmented reality display may comprise at least one of a wearable device or a mobile device. In some embodiments, the modified visual effect modifies the appearance of the proxy object 202 through the augmented reality display.

At step 508 the processor 102 transmits a haptic signal associated with the haptic effect to the haptic output device. For example, the haptic output device(s) in the shoe may output a haptic effect that simulates the texture of blue leather on the shoe. In some embodiments, the proxy object 202 may comprise one or more haptic output devices 118. The proxy object 202 may be one or more of a shoe, an article of clothing, an electronic device, a display, an interface object, or an interior of a vehicle.

At step 510 processor receives an input signal from an input capture device. In some embodiments, a user may use an input capture device, e.g., an audio capture device, a touchscreen, a keyboard, a mouse, a joystick, or an augmented reality control board, to instruct the system on what texture needs to be displayed. For example, a user may say, "apply red suede material to shoe" into a microphone. The processor 102 receives an input signal from the microphone representing this instruction. The processor 102 may then determine any necessary modifications to the visual or haptic effect based on this signal. So, the display of the wearable AR device 204 shows the shoe change from a blue leather material to a red suede material and the haptic effect output by the shoe changes from a blue leather texture to a red suede texture.

Some embodiments described herein provide a more immersive, better optimized experience by combining an AR space with real proxy objects featuring real-world haptic effects. In other embodiments, proxy objects are combined with wearable peripheral devices to enable more compelling haptics because not all haptic feedback needs to be rendered by haptic actuators. Due to the ease of changing the texture and appearance of proxy object, product design becomes more efficient and cost effective.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
a proxy object comprising one or more haptic output devices;
a display configured to output a visual effect onto a surface of the proxy object;
a sensor for tracking a position of the proxy object; and
a processor configured to:
determine a modified visual effect based in part on data received from the sensor;
determine a haptic effect based in part on data received from the sensor;
transmit a display signal associated with the modified visual effect to the display, the modified visual effect to be displayed on the proxy object via the display;
transmit a haptic signal associated with the haptic effect to the one or more haptic output devices; and
output the haptic effect using the one or more haptic output devices.

2. The system of claim 1, further comprising a wearable device comprising one or more second haptic output devices.

3. The system of claim 1, wherein the proxy object comprises one or more of: a shoe, an article of clothing, an electronic device, a display, an interface object, or an interior of a vehicle.

4. The system of claim 1, wherein the proxy object comprises neutral physical characteristics.

5. The system of claim 1, wherein the modified visual effect is configured to modify an appearance of the proxy object through the display.

6. The system of claim 1, wherein the display comprises at least one of: a wearable device or a mobile device.

7. The system of claim 1, wherein the sensor comprises at least one of a camera, a laser, a radar, an accelerometer, a gyrometer, a pressure sensor, a magnetic sensor, a light sensor, a tracking sensor, or a microphone.

8. The system of claim 1, wherein the processor is further configured to receive an input signal from an input capture device and determine the haptic effect based in part on data received from the input capture device.

9. The system of claim 1, wherein the haptic effect is configured to modify a texture of the proxy object.

10. The system of claim 9, wherein the haptic effect is configured to simulate the texture of one or more of: leather, plastic, rubber, metal, burlap, suede, denim, wood, cloth, ceramic, foamed material or glass.

11. A method comprising:
  determining a modified visual effect based in part on data received from a sensor;
  determining a haptic effect based in part on data received from the sensor;
  transmitting a display signal associated with the modified visual effect to a display, the modified visual effect being displayed on a surface of a proxy object via the display, the proxy object comprising one or more haptic output devices;
  transmitting a haptic signal associated with the haptic effect to the one or more haptic output devices; and
  outputting the haptic effect using the one or more haptic output devices.

12. The method of claim 11, further comprising:
  determining a second haptic effect;
  transmitting a second haptic signal associated with the second haptic effect to one or more second haptic output devices; and
  outputting the second haptic effect using the one or more second haptic output devices, the one or more second haptic output devices being mechanically coupled to a wearable device.

13. The method of claim 12, wherein the haptic effect is configured to modify a texture of the proxy object.

14. The method of claim 13, wherein the haptic effect is configured to simulate the texture of one or more of: leather, plastic, rubber, metal, canvas, enamel, burlap, suede, denim, wood, cloth, ceramic, foamed material or glass.

15. The method of claim 11, wherein the proxy object comprises one or more of: a shoe, an article of clothing, an electronic device, a display, an interface object, or an interior of a vehicle.

16. The method of claim 11, wherein the proxy object comprises neutral physical characteristics.

17. The method of claim 11, wherein the modified visual effect is configured to modify an appearance of the proxy object through the display.

18. The method of claim 11, wherein the display comprises at least one of: a wearable device or a mobile device.

19. The method of claim 11, wherein the sensor comprises at least one of a camera, a laser, a radar, an accelerometer, a gyrometer, a pressure sensor, a magnetic sensor, a light sensor, a tracking sensor, or a microphone.

20. The method of claim 11, further comprising receiving an input signal from an input capture device and determining the haptic effect based in part on data received from the input capture device.

21. A non-transitory computer readable medium comprising program code, which when executed by a processor is configured to cause the processor to:
  determine a modified visual effect based in part on data received from a sensor;
  determine a haptic effect based in part on data received from the sensor;
  transmit a display signal associated with the modified visual effect to a display, the modified visual effect being displayed on a surface of a proxy object via the display, the proxy object comprising one or more haptic output devices;
  transmit a haptic signal associated with the haptic effect to the one or more haptic output devices; and
  output the haptic effect using the one or more haptic output devices.

* * * * *